United States Patent [19]
Schoonen et al.

[11] 3,807,147
[45] Apr. 30, 1974

[54] HIGH EFFICIENCY AIR FILTER

[75] Inventors: Anthony E. Schoonen, Montreal, Quebec; Michael J. Shorthouse, Rexdale, Ontario, both of Canada

[73] Assignee: Johnson & Johnson, New Brunswick, N.J.

[22] Filed: May 13, 1971

[21] Appl. No.: 143,160

[30] Foreign Application Priority Data
May 15, 1970 Canada .................................. 083395

[52] U.S. Cl. ..................... 55/368, 55/375, 55/381, 55/483, 55/500, 55/509
[51] Int. Cl. ........................................... B01d 46/02
[58] Field of Search ............. 55/368, 375, 380–382, 55/486–488, 376–377, 373, 483, 497–499, 507, 509, 500

[56] References Cited
UNITED STATES PATENTS

| 688,559 | 12/1901 | Thurman | 55/381 X |
|---|---|---|---|
| 2,961,063 | 11/1960 | Fesco | 55/381 |
| 3,025,964 | 3/1962 | Summers et al. | 55/498 X |
| 3,217,472 | 11/1965 | Babbitt et al. | 55/368 X |
| 3,261,148 | 7/1966 | Wurtenburg | 55/376 X |
| 3,387,433 | 6/1968 | Mackey | 55/373 X |
| 3,400,519 | 9/1968 | Korn et al. | 55/368 X |
| 3,422,602 | 1/1969 | Janson | 55/486 X |
| 3,440,807 | 4/1969 | Gaines | 55/497 |
| 3,505,795 | 4/1970 | Wurtenburg | 55/499 |
| 3,606,740 | 9/1971 | Ballennie | 55/501 X |

FOREIGN PATENTS OR APPLICATIONS

| 1,000,457 | 8/1965 | Great Britain | 55/381 |
|---|---|---|---|
| 113,267 | 5/1943 | Sweden | 55/373 |
| 772,862 | 12/1967 | Canada | 55/509 |

*Primary Examiner*—Frank W. Lutter
*Assistant Examiner*—Vincent Gifford

[57] ABSTRACT

A "high efficiency" filter which has a pair of primary pockets, each primary pocket including a pair of secondary pockets so as to provide improved filtering characteristics.

3 Claims, 7 Drawing Figures

PATENTED APR 30 1974　　　　　　　　　3,807,147
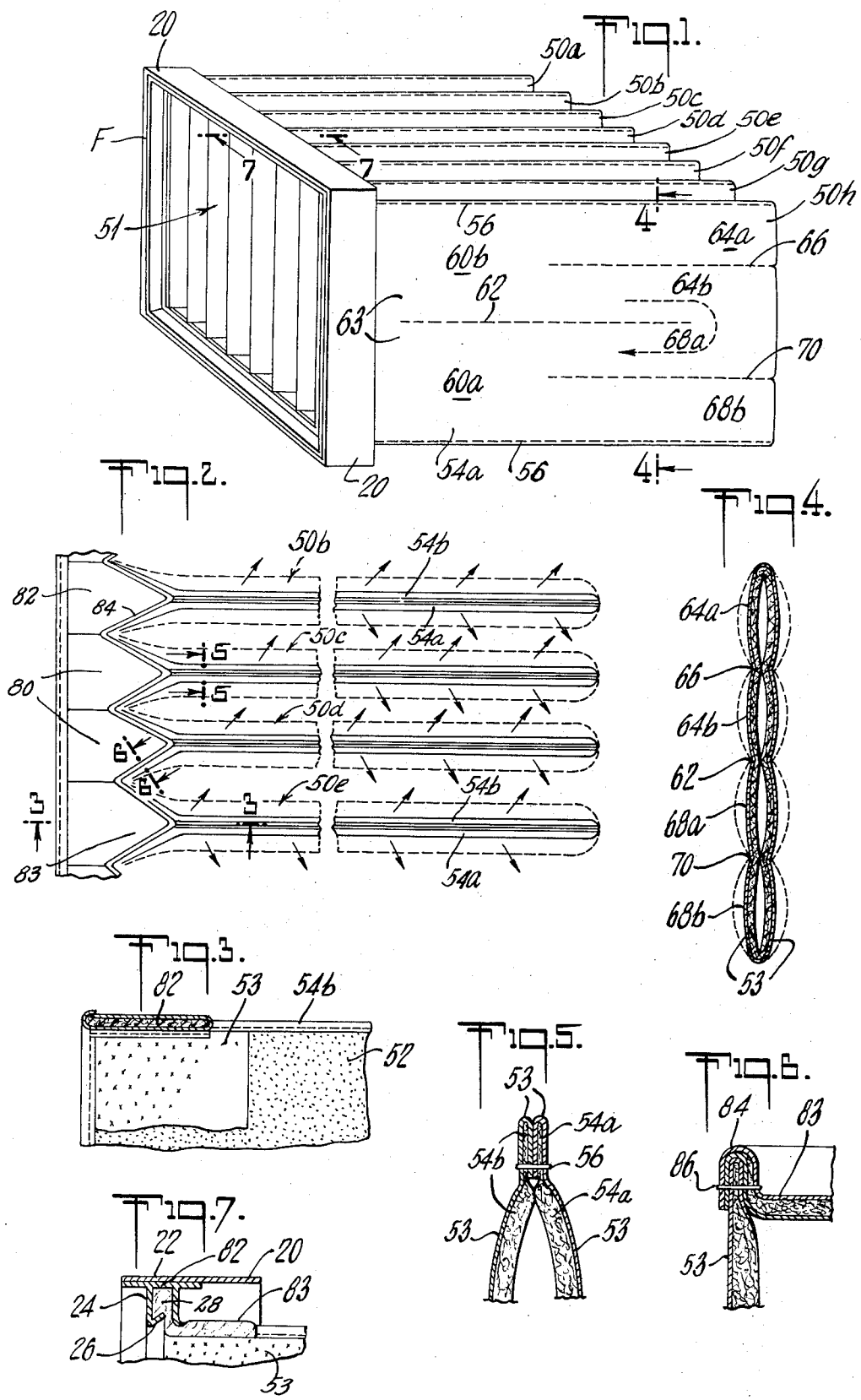

HIGH EFFICIENCY AIR FILTER

This invention relates to filters.

More particularly, this invention relates to filters of the type known in the art as "high efficiency" filters adapted to remove fine particles of foreign matter from gaseous streams.

High efficiency filters find various applications in different arts and for different purposes — a typical example of their use involves the filtering of air in hospitals, computer centers and in laboratories, etc. Such filters remove both visible and invisible particles of foreign matter, and contrast with the more "coarse" type of filter removing large particles — e.g. industrial filters such as furnace filters.

Among the requisite requirements for high efficiency type filters are low pressure drop characteristics coupled with high filtering efficiency. The pressure drop characteristics of the filter media must be maintained very low — e.g., typically not more than 1 inch water at an air flow of 400 to 500 c.f.m. per square foot of filter entrance area, as otherwise increased pressure is required to pass a given volume of gaseous medium to be filtered, which lowers the filtering efficiency and results in the possibility of tears in the filter media. Therefore, high efficiency filters should also have an air permeability factor of at least about 35 c.f.m. per square foot of filter area. These characteristics are inherently coupled with filter efficiency of the media which must be at least 50 percent according to the National Bureau of Standards (NBS) requirements.

Conventionally, high efficiency type filters are constructed in a different manner than the more "coarse" type of filter, so as to obtain maximum filtering efficiency. To this end, such filters usually include several enclosures or pouches having an open end or mouth forming an inlet made of filter material, and termed "socks" in the art, extending on the downstream side of the filter with the inlets of the socks being adapted to receive a gaseous flow from the upstream side of the filter. The sides of the socks form the major filtering area of the filter; thus providing said filters with the maximum filtering area which typically may range anywhere from 10:1 to 25:1 in terms of filtering area to the size of the upstream face of the filter. To obtain maximum filtering capacity with the above pressure drop characteristics, ideally the gaseous medium to be filtered enters the socks with a minimum of turbulence and extends to the maximum depth of the sock with the sock being maintained in an "erect" condition and without the socks of the filter interfering with the filtering efficiency of adjacent socks.

The upstream side of high efficiency type filters are normally mounted in an open-faced holding frame (e.g., a frame border supporting the periphery of the filter) with the socks projecting from the frame to freely extend on the downstream side. Depending on any given application, there may be several filters mounted in individual frames to form a "bank" of filters for filtering large volumes of air.

Typically, conventional high efficiency filters include a filter medium of microdiameter filtering material, and have a thickness between the upstream and downstream sides of between about three-sixteenths to about one-half inch. A typical microdiameter filtering material is microglassfiber wherein the average diameter of the fibers ranges from several hundred-thousandths of an inch to approximately 15 or 25 hundred-thousandths of an inch. Such filtering material is formed into a batt, and subsequently into a filter with socks; usually the external surfaces of the socks are provided with a covering material such as a nonwoven fabric to prevent accidental rupturing during manufacture and use. However, the degree to which the covering layer can aid in reinforcing the filtering material is very limited since it must not impede the filtering efficiency and pressure drop characteristics of the filter below the above values. Filtering material, when formed into socks, is very flexible and fragile, and does not possess sufficient strength characteristics to permit the socks of the filter to stand erect — i.e., without the aid of extraneous supporting means, the socks will sag or collapse when the filter is not in use and at low flow volumes, whereby pressure drop characteristics of the filter are increased and the filtering efficiency decreased. Moreover, at higher volumes of gas flow, the air in the socks will cause the sides to bulge, particularly in the central areas, and it has been found that where there are two or more adjacent socks in a filter, the sides of the adjacent socks come together and prevent the air from being effectively filtered through the maximum available filtering surface, with the pressure drop characteristics being increased substantially by interference from adjacent socks. Still further, according to existing sock constructions, the gas flow into the sock is not filtered through the maximum area in that the gas does not filter throughout the entire length of the sock but rather is concentrated in the central areas.

To overcome this problem, many different solutions have been proposed. By way of example, it has been suggested to provide a metal framework supporting the socks in an erect position, which metal framework extends at least partially upwardly from the bottom side of the socks. However, this solution is not acceptable since the fragile nature of the filter material, due to abrasion against the framework, will cause tears or rips in the socks thus rendering the filter substantially useless. Other proposals have involved the suggestion of stiffeners in the socks — however, this type of arrangement is also not satisfactory since it cuts down on the filtering area and moreover is not effective in providing uniform air flow or gaseous flow distribution for maximum filtering efficiency throughout the entire area of the sock.

The disadvantages of the prior art are overcome by the present invention, by providing a filter having, according to one aspect, an improved sock construction for such filters wherein the sock comprises a pair of interconnected primary pockets having a common inlet and extending generally in the principal direction of gaseous flow in the sock, with each of the primary pockets having a pair of secondary pockets therein, with a common inlet, the secondary pockets being located in the primary pockets of the sock in the downstream direction of the sock.

More particularly, a preferred embodiment of the above comprises a filter medium of microdiameter filtering material, said filter including at least one filter sock of said material, said sock having an open end portion for receiving a flow of gaseous medium to be filtered and a pair of opposed side walls forming major filtering surfaces, said side walls of said sock together forming a pair of primary pockets extending generally in the principal direction of gaseous flow in said sock, said primary pockets extending a substantial distance of the length of said sock, each of said primary pockets including therein a pair of secondary pockets formed by said side walls, said secondary pockets being located downstream of said primary pockets and extending generally in the direction of gaseous flow in said sock.

The improved sock structure of the filters of this invention may be simply and economically achieved by employing spaced-apart side walls of filter material joined together about their periphery on all sides except one end, to form an open-ended enclosure, with the opposed side walls being secured together — e.g. by stitching, along a generally central line extending along the gaseous flow axis of the sock about a substantial length of the flow axis, with the side walls being further secured together on either side of the first-mentioned line, and also along the gaseous flow axis of the sock, the last-mentioned lines of joinder of the side walls being located at a point spaced from the first-mentioned line at a point downstream of the flow axis.

A typical filter of this invention may include between four to eight socks according to conventional practices; however, it will be understood by those skilled in the art that the number of socks in a given filter may vary as desired and required for a given application. In some cases, a high efficiency filter may only require a single sock where there is a low gaseous flow to be filtered; in cases where the filters are designed to accommodate up to 250 cubic feet of gas flow per square foot of filter entrance area, conventionally four pockets are employed; while in cases of gaseous flows of 250 to 500 cubic feet per minute or greater of gas flow per square foot of filter entrance area, eight socks are conventionally used.

The depth of the pockets — i.e., the length of the sock in the gaseous flow direction, will depend on several factors including the volume of gaseous medium to be filtered, the degree of filtering efficiency required, etc. Typically, according to conventional practices, the socks may range from 12 inches to 40 inches or more in length. The socks may vary in height, which may be from several inches to 2 feet or more.

The filters of the present invention may be constructed according to conventional practices employing conventional materials. Usually, the most common filtering medium for high efficiency type filters is microdiameter glass fiber having fiber diameters ranging from a few hundred-thousandths of an inch to approximately 4 or 5 hundred-thousandths of an inch, although other materials having the same characteristics may be employed. Particularly preferred for use in the present invention is microdiameter glass fiber marketed under the trade mark "MICROFIBERGLASS FM" having a fiber diameter average of between 0.00003 to about 0.00004 or 0.00005 inch.

The glass fiber filtering medium, again as with conventional practices, should have an air permeability factor of at least 35 cubic feet per minute per square foot with a pressure drop characteristic of not more than one inch of water at an air flow of 400 – 500 cfm per square foot of filter entrance area. To this end, the thickness and density of the filter medium may vary; conventionally filter mediums having the above requirements may vary from about three-sixteenths of an inch to about one-half inch in thickness using the above fiber diameters while maintaining pressure drop characteristics within the above range.

In the filter of the present invention, utilizing the above-described preferred construction wherein the opposed side walls of the sock are joined together (e.g., by stitching) along a first centrally located axial gaseous flow line to form the primary pockets, both primary pockets are desirably substantially the same size. Preferably, the line of joinder between the side walls of the sock extends from a point removed from the gaseous flow inlet of the sock on the upstream side thereby to form a common inlet portion of both primary pockets. The distance between the mouth or inlet portion of the sock and the point at which the side walls are joined together may vary depending on the depth of the sock and may be for example several inches — e.g., 4 to 8 inches. The distance, however, should be less than one-fourth of the length of the depth of the sock in order to prevent undesirable ballooning or bulging of the side walls on high volume gaseous flows into the sock.

Although the line of joinder in the side walls forming the primary pockets may extend to the downstream end of the sock, desirably the line of joinder terminates short of the downstream end to permit gaseous communication at the downstream end of the sock between the gaseous flow channelled into the two primary pockets. Such an arrangement has the advantage of permitting a more even distribution of air due to uneven flows entering the primary pockets, and further to aid in obtaining maximum downstream flow into the sock of the gaseous stream.

In the above preferred embodiment, the side walls of the sock are further joined together along the axial gaseous flow line on either side of the first line of joinder, to form secondary pockets in the sock. Desirably the side walls are further joined at a point removed from the upstream end of the first line of joinder between the side walls whereby the secondary pockets begin at a point downstream of the formation of the primary pockets. It is preferred that each secondary pocket be of substantially the same size, whereby the line of joinder between the two said side walls of the sock is spaced substantially equidistant on either side of the primary joinder line. The line of joinder between the side walls forms the secondary pockets such that these pockets extend to the downstream end of the sock; however, they may terminate short of the end. It is preferred that the further line of joinder between the side walls forming the secondary pockets extend between 30 percent to 60 percent of the length of the sock, which arrangement has been found to provide the most desirable results in retaining the sock erect during low gaseous flows and for preventing ballooning of the sides during high gaseous flows and for providing maximum opening of the socks at their entrance.

In joining the side walls of the sock together to form the primary and secondary pockets, stitching is preferred as the most economical and simplest method; however, other methods may also be used, such as, for example, stapling. However, in joining the side walls together, it is most desirable that the means used to do so should not perforate or otherwise tear the sock as its effective use as a filter will be diminished.

The filter of the present invention is preferably made of a single continuous length of the elongated rectangular batt provided with pleats or overlapped portions on the same side (the number of pleats corresponding to the number of socks desired in the product) with the sides of the pleats forming the respective sides of each sock. The pleats are joined together at their free margins as for example by stitching or stapling to form the sock enclosure. According to conventional practices, the filtering material may be provided with reinforcing scrim, such as non-woven fabrics, on the exterior surfaces thereof to increase the handling strength and prevent tears in the product during manufacture and use, it being understood that such material must of course not decrease the air premeability factor or increase the pressure drop characteristics below the above-mentioned values. Similarly, the upstream side walls forming the inlet or mouth portion of the sock may likewise be reinforced with suitable material such as nonwoven fabrics. Also, conventionally, the walls of adjacent socks are sewn or otherwise joined together to form a reinforced mouth portion.

The filters of the present invention may be incorporated into any suitable type of frame for mounting purposes such frames being made out of conventional materials such as wood, metal or plastics. Typically, the frames are open-faced rectagular frames with the filter being maintained or mounted in or on the frame by suitable means — it being understood that the filter is mounted so as to prevent air escape between the frame and the filter. A particularly preferred frame construction employed for use with the filters of the present invention includes a channel type frame member such as that illustrated in Canadian Patent No. 772,862, issued Dec. 5, 1967 to A. P. Ruffo et al. Briefly summarized, this patent teaches a frame having a channel for receiving the edge of a filter medium with the channel being defined by a base, a rigid wall and a resilient wall, in spaced-apart relationship. There is provided a rigid finger formed integrally with the rigid wall which slopes downwardly towards the rigid wall and has its free end stopping short of the resilient wall to form a gap through which the filter is entered and gripped between the finger and the resilient wall. Such a frame construction in combination with the filters of the present invention provide airtight connections preventing escape of air between the filter and the frame. To this end, the filter of the present invention is preferably provided with a gripping tab portion as hereinafter described.

In accordance with a further aspect, there is also provided a tab construction suitable for incorporation into a sock of a high efficiency type filter, for permitting a sock to receive a maximum gaseous flow with a minimum amount of gas flow turbulence when entering the sock. In accordance with this aspect, a sock construction is provided with a tab at the opposed ends of the inlet or mouth portion between the side walls of the sock, which tab comprises a body of a filtering medium which has at least the same filtering efficiency as that of the socks and desirably has at least the same pressure drop characteristics as the sock. The body of the tab includes a gripping portion projecting on the upstream side of the filter, and inwardly tapering side walls on the downstream side of the filter connected to the side walls of the sock.

The gripping portion of the tab construction is provided for the purpose of permitting engagement of the sock with retaining means — e.g., a frame, thereby to mount the sock for operative use. To this end, the gripping portion may vary in length and width depending on the amount of material required for engaging with the cooperative retaining means.

The body of the tab which projects on the downstream side of the filter preferably has substantially equal tapering sides — i.e., in a most preferred form the downstream side of the body is of a triangular shape with the apex of the triangle being located at the sock entrance between the opposed sides of the sock. The width of the triangular body at its base may vary depending on the size of the sock, and may be from one inch or less to several inches or more. This aids in allowing the sock to open to the maximum at the entrance. The depth to which the tab inwardly extends may also vary, again depending on the size of the sock and may be from one to several inches.

The tab construction, as mentioned above, must have at least the same filtering efficiency as the material from which the sock is made as otherwise the tab would provide for a lower filtering efficiency thereby decreasing the overall filtering efficiency of the filter. To this end, the material from which the tab is made is preferably the same as that from which the sock is constructed - in a preferred embodiment, this material is microdiameter glass fiber having the characteristics previously described.

Having thus generally described the invention, reference will now be made to the accompanying drawings illustrating preferred embodiments and in which FIG. 1 is a perspective view of a filter according to the present invention, shown mounted in a frame;

FIG. 2 is a partial top plan view of the product of FIG. 1 with the filter frame being removed;

FIG. 3 is a section taken along the line 3—3 of FIG. 2;

FIG. 4 is a vertical section taken along the line 4—4 of FIG. 1 showing the pocket construction of the filter;

FIG. 5 is a section taken along the line 5—5 of FIG. 2 showing the method of closing the top and bottom of the filter socks;

FIG. 6 is a section taken along the line 6—6 of FIG. 2; and

FIG. 7 is a section taken along the line 7—7 of FIG. 1 illustrating a preferred method of securing the filter to the frame.

In the drawings, there is illustrated a high efficiency type filter of the present invention, which in FIG. 1 is mounted in a frame F for use in, e.g., an air filter duct.

Referring initially to FIGS. 1 and 7, the frame F may be of any suitable construction for mounting and retaining the filter; in a preferred embodiment, the frame is constructed according to the teachings of Canadian Pat. 772,862 of suitable material, having regard to the service requirements of the frame. To this end, the frame includes L-shaped angle members 20 joined to form a rectangular border, and a connector for removably mounting the filter, being located interiorly of members 20 about the frame. The connector includes a base 22 secured to members 20 with a rigid wall 24 extending upwardly therefrom; the wall including a downwardly sloping finger 26, preferably sloped at an angle of about 30°. The base 22 also mounts a resilient wall 28, which together with wall 24, forms a channel for mounting the free marginal edge of a filter. The wall 28 forms with the finger 26 a gap through which the filter margins are entered and gripped.

In mounting a filter using this type of frame, the free edges of the filter surrounding the inlet portion on the upstream side may be merely "tucked in" between the resilient wall 28 and the finger 26 by a suitable roller such as that described in Canadian Pat. No. 772,862.

The high efficiency filter illustrated in the drawings is typically 24 inches by 24 inches, comprised of a single elongated length of microdiameter glass fiber batt and includes in this case, eight air filter socks indicated generally by reference numerals 50a, 50b, 50c, 50d, 50e, 50f, 50g and 50h. The sock construction is composed of "loops" of the glass fiber batt joined together along their top and bottom margins by means of, for example, stitching 56 to leave an open mouth portion on the upstream side of the filter to provide a gaseous inlet for the sock, which is otherwise closed on all sides. Thus, the sock construction does not provide any escape for the gaseous stream without being filtered. The gaseous stream to be filtered will thus enter the pockets individually, as indicated by the arrow 51 in FIG. 1.

Conventionally, the glass fiber batting, indicated generally by reference numeral 52, is provided with a covering layer, in this case a layer of nonwoven material indicated by reference numeral 53, on the exposed surfaces of the filter, to provide reinforcement for handling purposes. Depending on the particular filter, the covering layer 53 may extend inwardly of the sock entrance as shown in FIG. 3.

Each sock construction, as described above, therefore includes a pair of side walls 54a and 54b and in accordance with this invention, form therebetween a pair of primary air pockets designated by reference numerals 60a and 60b defined by a line of joinder extending through the side walls — e.g., stitching 62. The line of stitching 62 is preferably located centrally from the top and bottom edges of the sock dividing the sock into approximately equal pockets, and as will be seen extends in a line parallel to the flow axis of a gaseous medium in the sock. According to the preferred embodiment shown, the stitching begins at a point removed from the upstream end of the filter to leave a common gaseous flow entrance indicated by reference numeral 63, and terminates short of the downstream end of the sock as will be seen in FIG. 1, thereby forming a common passage between the pockets 60a and 60b.

Each sock further includes a pair of secondary pockets on the downstream side of the primary pockets indicated by reference numerals 64a and 64b, and 68a and 68b, defined by lines of joinder extending through the side walls 54a and 54b, which in this case is by stitching 66 and 70. Again, as will be seen from FIG. 1, the lines of stitching 66 and 70 are located in a line parallel to the gaseous flow direction, and desirably divide the pockets 60a and 60b into substantially equal secondary pockets.

According to a further aspect, a high efficiency type filter, preferably of the type described above, is provided with novel means for maintaining the mouth portion of a filter sock in an open condition to permit the maximum gaseous flow into the sock with the minimum amount of turbulence. To this end, a filter sock is provided with a tab construction incorporated between the side walls 54a and 54b on the upstream side, which in the embodiment shown, comprises a pentagonally shaped tab 80 having a free upstream end portion 82 of filtering medium, forming a gripping portion adapted to engage a holding or retaining means for the filter. Each tab 80 includes a triangularly shaped body portion 83 on the downstream side of the filter having inwardly converging sides 84 projecting between the opposed sides 54a and 54b of the sock, and joined thereto by, for example, stitching 86.

In the embodiment shown, all of the tabs may form a single continuous length of material with the gripping portion 82 being common between each tab construction.

To mount the filter, using the preferred retaining means illustrated in the drawings, the gripping portion 82 will be inserted between the opposed walls 24 and 28 as shown in FIG. 7.

In use, the gaseous medium to be filtered will enter the mouth portion of the individual socks and thereafter flow into the primary pockets 60a and 60b, and subsequently into the secondary pockets 64a and 64b, 68a and 68b, the filtering action taking place by the gaseous flow extending through the sides 54a and 54b of each sock. The socks will assume an "inflated" condition as indicated by the dotted lines in FIGS. 2 and 4 upon a gaseous stream flowing therein, but the adjacent socks will not come into contact with each other which would thus diminish the filtering efficiency of the socks. Moreover, it has been found that using the sock construction of the present invention the gaseous flow tends to be filtered throughout the complete length of the sock rather than the central portion as would be encountered should the pocket construction of the present invention not be employed.

What is claimed is:

1. A high efficiency type filter suitable for filtering foreign matter from a gaseous medium comprising a filter medium of microdiameter filtering material, said filter having a plurality of filter socks, each sock comprising a pair of opposed substantially coextensive side walls forming major filtering areas, said side walls being joined together to form an open-ended enclosure adapted to receive a flow of gaseous medium to be filtered through said side walls, said side walls being joined together along a plane generally parallel to the principal flow direction of a gaseous medium in said sock to form a first pair of substantially similar pockets having a common entrance in said sock at said open end, said side walls being joined together from a first point removed from said open end along a substantial portion of the length of said side walls to a second point spaced from the other end of said sock opposite said open end, said side walls being further joined together on either side of the first line of joinder along a plane generally parallel thereto from a third point located between said first and second points to a fourth point located at said other end of said sock to form a further pair of substantially similar pockets on either side of the first line of joinder.

2. A filter according to claim 1 wherein said filtering material is microdiameter glass fiber.

3. A filter according to claim 1, wherein each sock has an open end mouth portion adapted to receive a flow of gaseous medium to be filtered, a tab at the opposed ends of said mouth portion, said tab including a gripping portion on the upstream side of said sock, and inwardly tapering side walls on the downstream side of said sock connected to said sock.

* * * * *